United States Patent Office 2,702,755
Patented Feb. 22, 1955

2,702,755

PROCESS OF MAKING A LIQUID STARCH PRODUCT

Benjiman H. Chaney, Salt Lake City, Utah

No Drawing. Application January 31, 1951,
Serial No. 208,851

2 Claims. (Cl. 106—213)

This invention relates to certain new and useful improvements in processes for making prepared starches of the type used both domestically and commercially for the sizing and stiffening of various fabrics, and in the products of such process.

More particularly, this invention comprises the short time treatment of raw starch in aqueous alkaline solution under conditions of agitation effective to insure thorough mixing of the constituents, the treatment being carried out at a temperature at which pasting of the starch will be effected at the pH prevailing in the mixture. Upon completion of the treatment, the resultant liquid product is then back-neutralized to obtain the improved liquid starch of this invention.

Objects and advantages of the invention will be set forth in part hereinafter and in part will be obvious herefrom, or may be learned by practice with the invention, the same being realized and attained by means of the processes, steps and compositions pointed out in the appended claims.

The invention consists in the novel steps, processes, compositions and improvements herein shown and described.

The present invention has for its object the provision of a novel and improved process for the manufacture of a liquid starch product which has excellent keeping properties and does not readily separate on standing. A further object is the provision of a novel and more rapid process for the manufacture of liquid laundry starch which is economical and reliable in its operation and produces a product of uniformly high quality. The invention provides a process which may be carried out rapidly, at relatively low temperatures and results in the production of an improved liquid starch of excellent keeping properties which may be used for laundry starching, as a fabric size or as an adhesive.

In accordance with the process of the present invention, liquid starch for use as laundry starching, for the sizing of rugs or other fabrics, or for use as adhesives, is prepared in a stable, non-separating form by mixing powdered starch with a suitable quantity of water, and while this mixture is subjected to vigorous continuous agitation, the water and starch are simultaneously heated and brought to an alkalinity of from about pH 10 to about pH 12. The temperature of the water is initially from about 120° to about 140° F., and the temperature of starch-water mixture is increased as the solution is rendered alkaline by the addition of alkali. Only short periods of treatment of the starch in the alkaline solution at the elevated temperature are required, as distinguished from the long periods of treatment running to several or many hours which are generally regarded as necessary for production of a liquid laundry starch. I have found that treatments for as short a period as five to thirty minutes, and preferably of ten or fifteen minutes, are entirely sufficient, while the treatment may be continued for somewhat longer periods without harm to the finished product. After the time of treatment at elevated temperature and in alkaline solution has been completed, the solution is substantially neutralized or rendered slightly acid, by the addition of a suitable acidic compound such as sodium acid fluoride, ammonium fluosilicate, or alum and a sufficient amount of the acidic compound is preferably added to bring the solution to a pH of 5.5 to 7. Some excess acidity is generally desirable in view of the beneficial effect which such acidity would have in the subsequent laundering operations.

Additional agents may be added to the liquid starch thus prepared including preservatives such as small amounts of "Dowcide A" (sodium-o-phenyl phenate) and the ironing properties of fabrics treated with the liquid starch may also be improved by incorporating into the solution small amounts of sulfonated tallow or other water-soluble, oily or waxy material, such as the high molecular weight polyglycols sold under the name of "Carbowax."

The invention is generally applicable to all starches, and while cornstarch is the starch which is ordinarily preferred, the invention may also be carried out with other starches such as tapioca, rice, potato, arrowroot, or wheat starch.

The liquid starch may also be rendered non-freezing at ordinary temperatures, by adding to it substantial amounts of salt such as sodium chloride, and in addition to the salt formed by the neutralization of the caustic alkali used in the preparation of the liquid starch product.

When the preparation process has been fully completed, and the various additives such as the preservative, the soluble oil or wax and the freezing point depressing material have been added, the liquid starch is ready for bottling, and the bottled product may be stored for extremely long periods of time, and at temperatures ranging from 0° F. to 150° F. or more, without danger of the starch and liquid components of the bottled mixture separating. The product thus remains ready for immediate use by dilution with water in the same manner as freshly prepared, cooked laundry starch.

It will be understood that the foregoing general description and the following detailed description as well are exemplary and explanatory of the invention but are not restrictive thereof.

Referring now in detail to the present preferred and illustrative specific example of a process in accordance with the present invention, the liquid starch is prepared by adding from 6 to 12 ounces, preferably about 10 ounces, of thin boiling or 8 ounces of thick boiling, cornstarch, to 1 gallon of water heated to a temperature of 120° F. to 140° F. and which need not be specially purified. While the starch and water are subjected to continuous agitation, preferably by means of a mechanical stirrer, the liquid is rendered alkaline, and at the same time further heated by adding to it from 0.5 to 0.9 ounces, preferably about 0.7 ounces, of pure caustic soda, or from about 0.7 to about 1.2 ounces of commercial caustic soda containing about 76% NaOH, the amount of caustic soda added being sufficient to render the solution distinctly alkaline at from about pH 10 to about pH 12.

The temperature of the water at the beginning of the addition of the caustic is approximately 120° to 140° F., and the heat of the solution of caustic soda is sufficient to provide most of the heat necessary to raise the temperature of the solution to about 150° F. to about 160° F.

If necessary additional heat may be supplied externally so as to raise the temperature of the alkali solution and starch to that range, and care is taken to avoid overheating the solution such as might occur at temperatures of more than 160° F. However, in all cases the solution is gradually heated and simultaneously rendered more alkaline while the agitation of the solution is continued, thereby avoiding any tendency of the starch to lump as might otherwise occur. When the alkaline starch mixture has been sufficiently cooked, the alkali is fully neutralized by adding to the mixture the required quantity of acidic compound such as alum, ammonium fluosilicitate, ammonium acid fluoride or sodium acid fluoride.

No special care need be taken with reference to the purity of the water supply, and hard or soft water may be employed, although with some waters it may be necessary to adjust the amount of the alkali used to bring the pH of the heated solution to the optimum value.

While I prefer to use commercial grades of caustic soda on account of factors of cost, the other caustic alkalies may be used within the pH range given, and the various impurities normally present in the commercial grades of these materials do not deleteriously affect the operation of the process. The starch used may be any of the generally available commercial grades of starch, although for most purposes I prefer to use a clean, white grade of cornstarch.

The heat treatment of the starch dispersed in the alkaline solution is generally continued for a period of 5 to 30 minutes, and more preferably from 10 to 15 minutes, the exact time being determined by the quality of the starch, the alkalinity of the solution, and the temperature at which it is being treated.

As a lubricant to be effective on the starch after it has dried on the fabric, I prefer to add to the mixture a small amount of a sulfonated tallow or a water-soluble wax-like material such as "Carbowax." For this purpose a small amount of water-soluble lubricant is added to the mixture after it has been fully neutralized, the amount of such lubricant being from about 1% to 5% based on the amount of starch used.

As a preservative I prefer to use a small amount of some compound having relatively high fungicidal activity, such as 0.0025 to 0.0050 pound of "Dowcide A" per pound of starch. The freezing point of the liquid starch product may be depressed as desired such as by adding to it one-half to one pound of sodium chloride per gallon, depending upon the expected temperature of storage.

The invention in its broader aspects is not limited to the specific steps, compositions, combinations and improvements described but departures may be made therefrom within the scope of the accompanying claims without departing from the principles of the invention and without sacrificing its chief advantages.

What is claimed is:

1. A process of forming a stable liquid starch product which comprises agitating a mixture consisting essentially of raw, untreated starch powder in water, alkalizing and simultaneously heating the mixture until its pH is from about 10 to about 12 and its temperature is a temperature in the range of from about 140° F. to about 160° F. at which pasting of the starch will be effected at the pH prevailing in the mixture, continuing the alkaline heat treatment of the starch for a period of time from about 5 to about 30 minutes before neutralization and then neutralizing the mixture.

2. A process of forming a stable liquid starch product which comprises continuously agitating a mixture of raw untreated starch powder in water while adding from 0.5 to 0.9 ounce of a solid caustic alkali to each gallon of water to alkalize the mixture to a pH in the range of from between about 10 to about 12 and heat the water starch mixture to a temperature in the range of from between about 140° F. to about 160° F. at which pasting of the starch is effected at the pH prevailing in the mixture, continuing the alkaline heat treatment of the starch for a period of time from about 5 to about 30 minutes before neutralization and thereafter neutralizing the alkaline mixture to give a stable liquid starch product.

References Cited in the file of this patent

UNITED STATES PATENTS

| Number | Name | Date |
|---|---|---|
| 2,113,034 | Rowland | Apr. 5, 1938 |
| 2,346,644 | Bauer et al. | Apr. 18, 1944 |
| 2,373,016 | Daly et al. | Apr. 3, 1945 |